Figure 1:
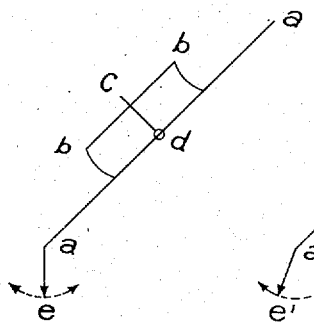

No. 12,413. REISSUED NOV. 28, 1905.

L. B. ATKINSON.

MECHANISM FOR RECORDING OR REGISTERING THE MAXIMUM MOVEMENT OF ANY MECHANISM.

APPLICATION FILED JUNE 22, 1903.

2 SHEETS—SHEET 1.

Witnesses:

George H. Tilden

Helen Oxford

Inventor:

Llewelyn B Atkinson.

by Albert G. Davis

Att'y.

No. 12,413. REISSUED NOV. 28, 1905.

L. B. ATKINSON.

MECHANISM FOR RECORDING OR REGISTERING THE MAXIMUM MOVEMENT OF ANY MECHANISM.

APPLICATION FILED JUNE 22, 1903.

2 SHEETS—SHEET 2.

Witnesses:

George H. Tilden

Helen Oxford

Inventor:

Llewelyn B. Atkison.

by Albert G. Davis,

Att'y.

UNITED STATES PATENT OFFICE.

LLEWELYN BIRCHALL ATKINSON, OF LONDON, ENGLAND, ASSIGNOR TO THE GENERAL ELECTRIC COMPANY, A CORPORATION OF NEW YORK.

MECHANISM FOR RECORDING OR REGISTERING THE MAXIMUM MOVEMENT OF ANY MECHANISM.

No. 12,413. Specification of Reissued Letters Patent. Reissued Nov. 28, 1905.

Original No. 706,146, dated August 5, 1902. Application for reissue filed June 22, 1903. Serial No. 162,685.

*To all whom it may concern:*

Be it known that I, LLEWELYN BIRCHALL ATKINSON, a subject of the King of Great Britain and Ireland, residing at Upper Tooting, London, S. W., England, have invented an Improvement in Mechanism for Recording or Registering the Maximum Movement of Any Mechanism, (for which I have made application for Letters Patent in Great Britain under No. 11,235, dated May 31, 1901,) of which the following is a specification.

This invention relates to improvements in mechanism for recording or registering the maximum movement of any mechanism, and has for its object the provision of cheap and simple recording mechanism capable of being so damped in its motion that momentary movements due to swinging or jerking of the mechanism the movement of which is to be recorded do not affect the recording mechanism.

My invention consists in the use of a detached hinged or rolling element normally standing in a position of equilibrium under the action of gravity, the said element being carried by another element movable through an angle under the control of the mechanism the movements of which are to be recorded and carrying in such angular movement the hinged or rolling element until at a determined point the latter is no longer in equilibrium and falls or rolls over into a second position of equilibrium, from which it cannot return unless reset, thus recording whether the limit of motion prescribed has been attained or not. The damping effect is produced by inclosing the recording element in glycerin, oil, or other liquid, so that momentary movements of the apparatus do not allow the recording elements to reach the second or non-returnable position of equilibrium.

There are many ways of carrying this invention into effect; but I shall describe two types of the device—one with a hinged element and another with a rolling element—each of which will be generic of its own kind, and in order that the nature of the invention may be more clearly understood I will describe it in relation to the accompanying drawings.

Figure 2:
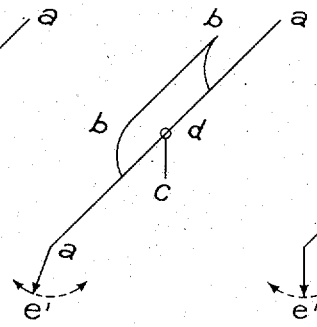
Figure 3:
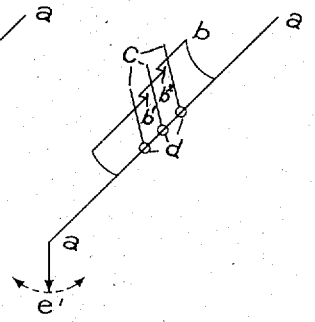
Figure 4:
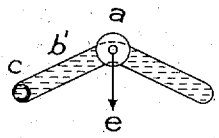
Figure 5:
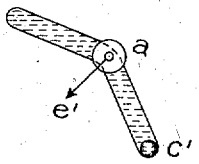
Figure 6:
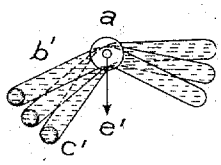
Figure 7:
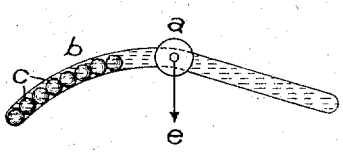
Figure 8:
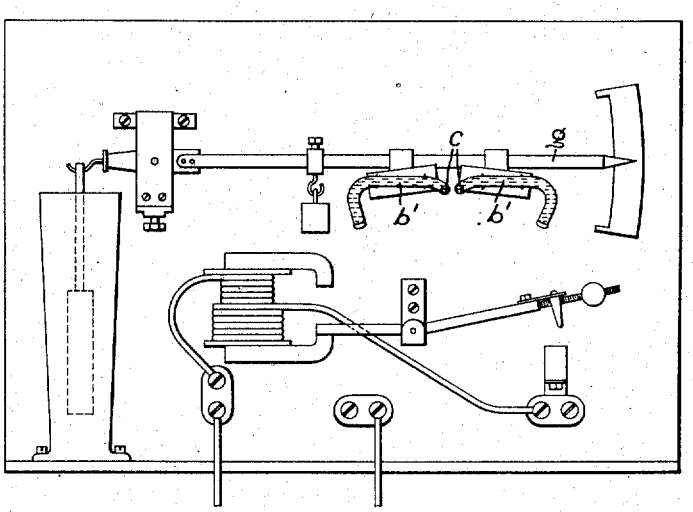
Figure 9:
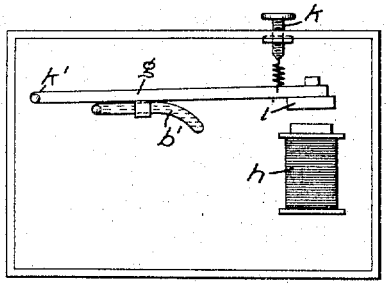
Figure 10:
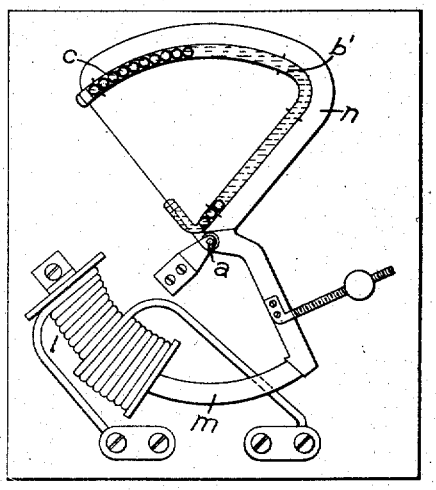

Figures 1, 2, and 3 are diagrammatic views illustrating the operation of the invention with hinged parts. Figs. 4 and 5 are views showing the operation with rolling members. Figs. 6 and 7 are similar views of modified forms. Fig. 8 is a plan view of the invention as embodied in an electric meter. Figs. 9 and 10 show the application of my invention to two other electrical devices.

Figs. 1 and 2 show a hinged mechanism *a a*, being an oscillating axle rocked on its axis by the arm *e*. *b b* represent a cradle having a bar lying behind the vertical plane containing *a a*. *c* is a bar hinged at *d* to the axis. In Fig. 1 the mechanism is in the first position of equilibrium. In Fig. 2 the arm *e* has moved to a new position *e'* and *c* has been carried over the vertical position by the cradle *b b* until the hinged arm *c* has fallen to the second position of equilibrium.

Figs. 4 and 5 show a rolling mechanism. *a* is a pivot. *b'* is a glass tube. *c* is a steel or other ball. *e* is the arm moving the mechanism. In Fig. 4 the ball is in the first position of equilibrum at one end of the tube. In Fig. 5, the arm having moved to a new position *e'*, the ball has rolled and lies at the other end of the tube at *c'* in the second position of equilibrium. In these cases there is a single recording element actuated when the mechanism has moved through a certain definite angle; but where it is desired to record the movement, great or small, a series of elements, as shown in Figs. 3 and 6, are provided, each being set at a different angular position of equilibrium, so that they are detached one after the other as the movement proceeds. When a cradle and plurality of arms are employed, as shown in Fig. 3, the cradle must be stepped, as shown at *b' b²*, in order that all the arms may not be overbalanced at once.

In the case of the rolling mechanism in place of a number of separate elements, as described and shown in Fig. 6, this may be done by placing a series of balls in one tube of a curved form, as in Fig. 7, when at successive angular positions successive balls pass the vertical plane and are detached, and the number found in the second position of equilibrium is a measure of the maximum angular displacement of the apparatus.

Where, as in the case of electric demand-indicators, the movement to be recorded is one lasting for some time—say ten or fifteen minutes—and where temporary oscillations are not to be recorded, the mechanism shown in Figs. 1 and 3 is wholly contained in a glass tube, through which the axis passes, the tube being filled with a viscous liquid. The tube in Figs. 4, 5, 6, and 7 may similarly be filled with a viscous liquid, such as oil, glycerin, or the like.

Fig. 8 shows the recording mechanism attached to the arm of an electrolytical meter, in which the operation is such that the arm *g* is arranged to be kept horizontal by the alternate charges and discharges of a meter. Two tubes *b′ b′* are provided in this case and each contains one ball *c*. One ball will be released from its position of equilibrium if the arm *g* rises too high. The other ball will be released if the arm *g* falls too low, and thus a record is obtained of the occurrence of any extreme movements of the arm *g* in either direction.

Fig. 9 shows a diagram of a similar type of mechanism for recording whether the load on an electric motor or other circuit has exceeded the stipulated or desirable amount. *h* is an electromagnet. *i* is the armature, held off by the spring and screw *k* and the end of the arm *g*, being pivoted at *k′* on the frame or base of the instrument. *b′* is the tube containing one ball *c*, which falls over when the slope of the arm *g*, corresponding to a movement produced by the predetermined current, is sufficient.

Fig. 10 shows an electric demand-indicator for indicating the maximum current in a circuit. *l* is a coil carrying a current. *m* is a core to be drawn into the coil and carried on an arm pivoted at *a*. *n* is a light frame carrying a bent tube *b′*. The upper part, curved as described, carries a series of balls *c*, and as the core is drawn into the coil the balls one at a time reach a position where they fall over, and the number lying in the lower tube is a measure of the maximum movement. Where it is desired that the record should be slow, the tube may be filled with oil or glycerin or the balls may be an exceedingly close fit in the tube. The balls need not drop and rest superposed on one another, as shown, but may be delivered into any-shaped receptacles arranged so that they can be readily counted.

I am aware that indicating apparatus of certain kinds, such as bell-indicators or the like, have been made in which the indicator passes from one position of equilibrium to another, but not as a part of the mechanism moving with and recording a defined angular movement of the part of the mechanism the movement of which it is desired to measure. I am also aware of apparatus in which by the movement thereof a liquid is caused to overflow from a receptacle to form a liquid index, indicating the amount of such motion.

Having now described my invention, what I claim, and desire to secure by Letters Patent, is—

1. In an instrument for recording the maximum demand in an electric circuit, the combination of a pivoted member the position of which is a measure of the demand in said circuit, means responsive to the demand in said circuit for moving said member, and a movable solid part coöperating with said member and normally held by gravity in one position of equilibrium relative to the member but moved to a second position of equilibrium when a predetermined movement of said member takes place.

2. In an electrical maximum-demand instrument, a pivoted arm, a current-carrying coil for oscillating said arm in response to the demand in an electric circuit, a curved tube or channel carried by said arm, and a rolling element in said tube or channel.

3. In an electrical maximum-demand instrument, a pivoted movable arm, a current-carrying coil for moving said arm, a curved tube or channel carried by said arm, two end portions of said tube or channel being normally beneath a portion intermediate them, but one of the end portions being moved above the intermediate portion by a certain movement of said arm, and a rolling element normally located in one of the end portions of said tube or channel but moved to the other end of said tube or channel when said certain movement of the arm takes place.

4. In an electrical maximum-demand instrument, a pivoted arm, a current-carrying coil for oscillating said arm, a curved tube or channel carried by said arm, and a rolling element and damping fluid in said tube or channel.

5. In an instrument for recording the maximum demand in an electric circuit, the combination of a curved tube or channel moving to different positions in response to different demands in said circuit, and a series of movable elements in said curved channel or tube adapted to move from one position of equilibrium to another position of equilibrium one by one, as the channel or tube moves into successive definite positions.

6. In combination, a tube or channel, means for moving it in accordance with changes in value of an electric quantity, a moving solid element in said channel tending to occupy one position of equilibrium or another in accordance with the position of the tube, and a damping fluid in said tube.

7. In a recording mechanism in combination an electromagnet, an armature, a pivoted arm carrying said armature, a curved tube or channel carried by said arm, the ends of said tube being normally below an intermediate connecting portion, and a rolling element in said tube or channel, said element being normally located at one end of said tube but being moved to the other end of said tube by a predetermined movement of said pivoted arm.

8. In a recording mechanism, a tube or channel comprising two substantially straight portions and a connecting portion, a solid element in said tube or channel, an electric circuit and means for causing the movable element in the tube or channel to move from a position of equilibrium in one of said portions to another position of equilibrium in the other of said portions in response to a certain predetermined change in the electrical condition of said circuit.

9. In an instrument for recording the maximum demand of an electric circuit, a part having a channel formed in it, a solid element carried in said channel, electromagnetic means for causing the element to pass from one position of equilibrium in said channel to another position of equilibrium in said channel upon a predetermined demand in said circuit, and means for preventing the return of said element to the original position of equilibrium upon the cessation of the predetermined demand in said circuit.

10. In an instrument for recording the demand in an electric circuit a part having a channel, said channel comprising two portions out of line with one another, a movable solid element carried by the channel, and electromagnetic means operatively connected to said circuit for causing said element to move from a position of equilibrium in one of said portions to a position of equilibrium in the other of said portions upon a predetermined demand in said circuit.

In witness whereof I have hereunto set my hand, in presence of two witnesses, this 19th day of May, 1903.

LLEWELYN BIRCHALL ATKINSON.

Witnesses:
ALFRED NUTTING,
H. D. JAMESON.